United States Patent
Kaprielian et al.

(10) Patent No.: US 8,180,514 B2
(45) Date of Patent: May 15, 2012

(54) AUTONOMOUS AGRICULTURE PLATFORM GUIDANCE SYSTEM

(75) Inventors: Craig L. Kaprielian, Reedley, CA (US); Bryan L. Aivazian, Casper, WY (US); Adam Bry, Denver, CO (US); Aleksander Lorenc, Harrington Park, NJ (US); Mark Cavolowsky, North Potomac, MD (US); Andrew Kalcic, St. Louis, MO (US); David Barrett, Needhan, MA (US)

(73) Assignee: Rocona, Inc., Casper, WY (US)

( * ) Notice: Subject to any disclaimer, the term of this patent is extended or adjusted under 35 U.S.C. 154(b) by 744 days.

(21) Appl. No.: 12/125,279

(22) Filed: May 22, 2008

(65) Prior Publication Data
US 2008/0294309 A1    Nov. 27, 2008

Related U.S. Application Data

(60) Provisional application No. 60/939,653, filed on May 23, 2007.

(51) Int. Cl.
    *G01C 22/00* (2006.01)
(52) U.S. Cl. ............ 701/27; 701/50; 701/207; 172/4.5
(58) Field of Classification Search .............. 701/23, 701/26, 27, 50, 205, 207; 342/357.31; 172/4.5, 172/9
See application file for complete search history.

(56) References Cited

U.S. PATENT DOCUMENTS

| | | |
|---|---|---|
| 4,463,811 A | 8/1984 | Winter |
| 4,482,960 A | 11/1984 | Pryor |
| 4,612,996 A | 9/1986 | Wolf et al. |
| 4,769,700 A | 9/1988 | Pryor |
| 5,379,966 A | 1/1995 | Simeone et al. |
| 5,438,817 A | 8/1995 | Nakamura |
| 5,544,474 A | 8/1996 | Finkelstein |
| 5,923,270 A | 7/1999 | Sampo et al. |
| 5,928,309 A | 7/1999 | Korver et al. |
| 5,974,348 A | 10/1999 | Rocks |
| 6,052,647 A | 4/2000 | Parkinson et al. |
| 6,088,644 A | 7/2000 | Brandt et al. |
| 6,134,486 A | 10/2000 | Kanayama |
| 6,141,614 A | 10/2000 | Janzen et al. |
| 6,199,000 B1 | 3/2001 | Keller et al. |

(Continued)

FOREIGN PATENT DOCUMENTS

JP    7184410 A    7/1995

(Continued)

OTHER PUBLICATIONS

International Search Report for corresponding International Application No. PCT/US2008/006546; Oct. 23, 2008; 10 pages.

*Primary Examiner* — Gertrude Arthur Jeanglaude
(74) *Attorney, Agent, or Firm* — James F. Hann; Haynes Beffel & Wolfeld LLP

(57) ABSTRACT

A guidance system for an agriculture platform that is capable of making decisions concerning the platforms direction and velocity regarding the pathway the platform is moving along as well as obstacles in the path of the platform, is provided. The autonomous agricultural platform guidance system and method will make it possible for small scale farming to take up automated mechanical farming practices which are currently only practical for large scale farming thus improving land utilization efficiency while lowering manpower costs dramatically.

32 Claims, 6 Drawing Sheets

U.S. PATENT DOCUMENTS

| | | |
|---|---|---|
| 6,232,910 B1 | 5/2001 | Bell et al. |
| 6,380,883 B1 | 4/2002 | Bell et al. |
| 6,385,515 B1 | 5/2002 | Dickson et al. |
| 6,400,308 B1 | 6/2002 | Bell et al. |
| 6,434,462 B1 | 8/2002 | Bevly et al. |
| 6,442,463 B1 | 8/2002 | Qiu et al. |
| 6,445,983 B1 | 9/2002 | Dickson et al. |
| 6,501,422 B1 | 12/2002 | Nichols |
| 6,553,299 B1 | 4/2003 | Keller et al. |
| 6,553,312 B2 | 4/2003 | Upadhyaya et al. |
| 6,643,576 B1 * | 11/2003 | O Connor et al. ............. 701/50 |
| 6,671,582 B1 | 12/2003 | Hanley |
| 6,686,951 B1 | 2/2004 | Dickson et al. |
| 6,721,453 B1 | 4/2004 | Benson et al. |
| 6,768,944 B2 | 7/2004 | Breed et al. |
| 6,804,587 B1 * | 10/2004 | O Connor et al. ............. 701/26 |
| 6,907,336 B2 | 6/2005 | Gray et al. |
| 6,934,615 B2 | 8/2005 | Flann et al. |
| 6,984,952 B2 | 1/2006 | Peless et al. |
| 7,065,440 B2 | 6/2006 | Aral |
| 7,085,637 B2 | 8/2006 | Breed et al. |
| 7,155,309 B2 | 12/2006 | Peless et al. |
| 7,277,792 B2 | 10/2007 | Overschie |

FOREIGN PATENT DOCUMENTS

| | | |
|---|---|---|
| JP | 8286748 A | 11/1996 |
| KR | 2004-0028204 A | 4/2004 |

* cited by examiner

US 8,180,514 B2

AUTONOMOUS AGRICULTURE PLATFORM GUIDANCE SYSTEM

CROSS-REFERENCE

This application claims the benefit of priority to U.S. Provisional Application No. 60/939,653 filed on May 23, 2007 which is herein incorporated by reference.

BACKGROUND OF THE INVENTION

The present invention relates to an autonomous agriculture platform guidance system and method. All publications cited in this application are herein incorporated by reference.

On large and small farms, tractors are the most indispensable tool of the modern farmer. Whether tilling the earth, spraying pesticides, or performing other general farm tasks, tractors have become a staple of today's agriculture. The tractor's dependence on human drivers is, however, a drawback. Humans are susceptible to fatigue, distraction, and have trouble multitasking and driving at night or in bad weather. Wages, benefits, and insurance can also make frequent operations prohibitively expensive. Regulations specify the length of time humans may be exposed to potentially hazardous substances (such as pesticides) and the safety equipment they must wear. Furthermore, driving a tractor, especially while wearing a protective non-porous suit in 112° F. weather, which is a typical temperature in some areas during the summer, is not an appealing career and is attracting fewer and fewer employees. Tractor drivers performing work in the field (like pesticide-spraying) must drive very slowly along identical rows and stay focused on one highly repetitive task all day long. They cannot bring reading material or any other diversion because an accident can destroy crops and jeopardize the life of the driver. By nature, humans just aren't are not as adept at maintaining focus under tedious conditions, and are arguably ill-suited for such a monotonous task.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements. It is an aspect of the present invention to provide a system of guidance for an automated agriculture platform comprising: (a) a platform mounted on a means of locomotion with controls for guiding and propelling said platform; (b) one or more types of sensing apparatus mounted on said platform selected from the group consisting of a global positioning system, light detection and ranging (LIDAR), an inertial measurement unit and a touch sensor; (c) a means of decision processing for determining the position of said controls comprising a computer and/or artificial intelligence electronics; (d) a means of communication between said sensing apparatus and said central processing unit and/or artificial intelligence electronics; and (e) a means of communication between said central processing unit and/or artificial intelligence electronics and said controls mounted on said platform.

It is another aspect of the present invention to provide a system where the system platform is selected from the group consisting of a tractor, an all-terrain vehicle, a jeep, a truck, and a tracked vehicle.

It is another aspect of the present invention to provide a system wherein the system controls are a velocity pedal actuator and a steering actuator.

It is another aspect of the present invention to provide a system wherein means of decision processing is determined by performing an analysis of: (a) the state estimation of the platform; (b) the cross tracker of the platform; (c) the motion control of the platform; and (d) the platform's actuator control.

It is another aspect of the present invention to provide a system wherein the state estimation is calculated by analyzing the actual state of said platform with the desired state of said platform.

It is another aspect of the present invention to provide a system wherein the actual state for the state estimation calculation is established using data selected from the group consisting of the global positioning system, the LIDAR, and said inertial measurement unit.

It is another aspect of the present invention to provide a system wherein the cross tracker is a calculation that is designed to create a perpendicular error line from said platform's current position in relation to said platform's desired path.

It is another aspect of the present invention to provide a system wherein the cross tracker calculation is established using data selected from the group consisting of said global positioning system, the LIDAR, and said inertial measurement unit.

It is another aspect of the present invention to provide a system wherein the motion control of the platform is based on the determination of the desired position for the steering actuator as well as the velocity pedal actuator in comparison to the actual position of the steering actuator and the velocity pedal actuator.

It is another aspect of the present invention to provide a system wherein the motion control determination is established using data selected from the group consisting of the global positioning system, the LIDAR, and the inertial measurement unit.

It is another aspect of the present invention to provide a system wherein the actuator control is determined by a steering torque and velocity pedal torque of the platform.

It is another aspect of the present invention to provide a system wherein the steering torque is established by comparing a desired steering position of said steering actuator with an actual steering position of said steering actuator.

It is another aspect of the present invention to provide a system wherein the velocity pedal torque is determined by comparing a present position of said velocity pedal actuator of said platform with a desired position of said velocity pedal actuator.

It is another aspect of the present invention to provide a system wherein an emergency stop circuit is mounted to the platform.

It is another aspect of the present invention to provide a system wherein the emergency stop circuit is triggered by an event selected from the group consisting: (a) the pressing of a manual emergency stop button; (b) said touch sensor is triggered; (c) the LIDAR senses an object in said platforms path; (d) the computer and/or artificial intelligence electronics is not in a ready state; and (e) the platform is in manual mode.

It is another aspect of the present invention to provide a system wherein the platform is manually driven through a pathway and the sensor or sensors gather data and communicates the data to the central processing unit.

It is another aspect of the present invention to provide a method of guidance for an automated agriculture platform on a means of locomotion wherein the guidance is determined by data regarding obstacles in a path of the platform and data regarding the position of the platform.

It is another aspect of the present invention to provide a method of guidance for an automated agriculture platform wherein the data regarding an obstacle in the path of the platform is provided by LIDAR.

It is another aspect of the present invention to provide a method of guidance for an automated agriculture platform wherein the data regarding the position of the platform is provide by a sensor selected from the group consisting of a global positioning system, LIDAR and an inertial measurement unit.

It is another aspect of the present invention to provide a method of guidance for an automated agriculture platform wherein the means of locomotion is selected from the groups consisting of a tractor, a jeep, an all-terrain vehicle, a tracked vehicle, and a truck.

It is another aspect of the present invention to provide a method of guidance for an automated agriculture platform wherein the data is analyzed by a central processing unit.

It is another aspect of the present invention to provide a method of guidance for an automated agriculture platform wherein the analysis is selected from the group consisting of state estimation, cross tracker, motion control, and actuator control.

It is another aspect of the present invention to provide a method of guidance for an automated agriculture platform wherein the state estimation is determined by comparing the present position of the platform and the desired position of the platform, and the present theta of the platform and the desired theta of the platform.

It is another aspect of the present invention to provide a method of guidance for an automated agriculture platform wherein the cross tracker is determined by comparing the present position of the platform and the desired position of platform, the present theta of platform and the desired theta of the platform, and present data from the LIDAR regarding the pathway the platform is moving through.

It is another aspect of the present invention to provide a method of guidance for an automated agriculture platform wherein the motion control is determined by comparing the present theta of the platform and the desired theta of the platform; and a command from a switch located on the platform in constant communication with the central processing unit where the command is selected from the group consisting of go, stop, and done.

It is another aspect of the present invention to provide a method of guidance for an automated agriculture platform wherein the actuator control is determined by velocity torque and steering torque.

It is another aspect of the present invention to provide a method of guidance for an automated agriculture platform wherein the velocity torque is determined by the current pedal position of the actuator control and the desired pedal position of the actuator control.

It is another aspect of the present invention to provide a method of guidance for an automated agriculture platform wherein the steering torque is determined by: the current steering position of the actuator control; and the desired steering position of the actuator control.

It is another aspect of the present invention to provide a method of guidance for an automated agriculture platform wherein an emergency stop circuit in constant communication with the central processing unit is mounted to the platform.

It is another aspect of the present invention to provide a method of guidance for an automated agriculture platform wherein the emergency stop circuit is triggered by an event selected from the group consisting of the pressing of a manual emergency stop button, a touch sensor is triggered, LIDAR system senses an object in the platform's path, the computer and/or artificial intelligence electronics is not in a ready state and the platform is in manual mode.

It is another aspect of the present invention to provide a method wherein the platform is manually driven through a pathway and the sensor or sensors gathers data and communicates the data to the central processing unit.

In addition to the exemplary aspects and embodiments described above, further aspects and embodiments will become apparent by study of the following descriptions.

DEFINITIONS

In the description and tables that follow, a number of terms are used. In order to provide a clear and consistent understanding of the specification and claims, including the scope to be given such terms, the following definitions are provided:

Actual State: as used herein means the real-time state or position of the platform.

Actuator Control: means an automated controller to control the directional steering of the platform or the control of the position of the velocity pedal of the platform.

Angle Fixer Calculation: means an embedded calculation that identifies and enables the platform to transition from its present theta to the desired theta.

Cross Tracker: means a calculation that calculates a perpendicular error line from the autonomous platform's current position to the desired path. The length of this line is the input to a PID controller which generates a desired heading, saturating at pi/2 which gives a perpendicular approach to the path for large errors lines. Unless it is saturated, the desired heading will always point in the direction of the next waypoint. When the intersection point of the perpendicular error line and the path line segment comes within a standoff distance of the next waypoint in the path, the calculation transitions to the next line segment.

Desired State: means the desired position or location of the platform in relation to the Actual State of the platform based upon the data collected during the platform's original progression through the pathway in question.

Global Positioning System: means group of satellites that transmit signals to a receiver which in turn uses the data from the signal to determine its location, speed, direction, and time.

High-level platform control: means the platform controls command the velocity and heading of the platform (through the Cross Tracking calculation) such that the platform follows the prescribed path.

IMU: mean an inertial measurement unit.

INS: means an inertial measurement unit.

LIDAR: means light detection and ranging or laser raster scanned three-dimensional mapping, wherein the LIDAR unit uses laser range finding to determine 181 distances in a half circle in front of the platform at intervals of one degree and is used to observe, locate and avoid objects in front of the platform.

Low-level platform control: means the platform controls the position of all the actuators such that they follow the directed inputs from the High-level Platform control.

Manual mode: means a state where the platform is operated by an individual and is not operated by the computer control system.

Motion controller: means determination of the desired position for the steering and pedal actuators and the comparison of that information to the actual current position of the steering and pedal actuators.

PDI: means proportional, integral, derivative control of the platform velocity pedal and/or the steering mechanism.

Platform: means a device with locomotion and controls as well as a system for guiding the device.

Ready state: means a state when the computer control system is able to receive and analyze data from the various sensors.

State Estimation: means the data provided by the sensor or sensors relating to the current state or position of the platform and is established by the equation $X_k = Ax_{k-1} - BU_k + W_k$, where $X_k$ is the state of the autonomous platform, given by position, heading, and velocity. The state estimate at time K relies on the state at time K−1, multiplied by a transform A that combines the components of the state together with the current model of the platform's physics. This calculates the new platform state, assuming no commands were given to the autonomous platform between the sampling points. To account for commands given to the autonomous platform, another term is added, consisting of U, the control signal, multiplied by a different transform B which maps it into the same form as the state. In reality, there is also some noise given by Wk.

Steering Torque: means the force required to rotate a steering mechanism to a desired position.

Teach and Playback: means the platform is manually driven through the pathway where an embedded computer records data provided by sensors, therefore defining a mission path to be followed by the platform at a later time.

Theta: means the compass angle, angle or direction of the platform.

Velocity Pedal Torque: means the force required to rotate or move the velocity pedal to a desired position.

BRIEF DESCRIPTION OF THE DRAWINGS

Exemplary embodiments are illustrated in referenced Figures of the drawings. It is intended that the embodiments and Figures disclosed herein are to be considered illustrative rather than limiting.

DETAILED DESCRIPTION OF THE INVENTION

Figure 1:
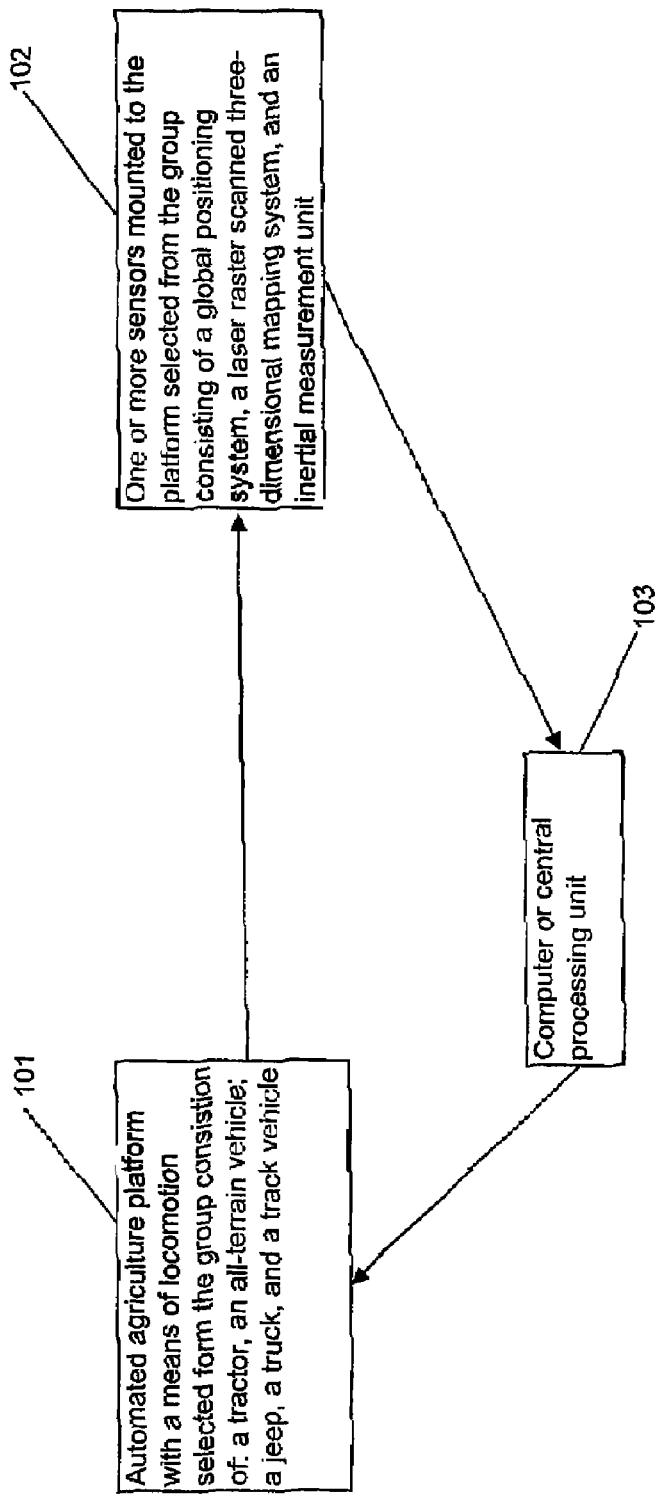
FIG. 1 shows a diagram depicting the overall components of the automated agriculture platform.

The present invention is a guidance system for an autonomous agricultural platform that takes advantage of the well-defined structure present in the fields of specialty crops. Fruit and nut trees, grapes, berries and perennial plants that are set into permanent rows provide an ideal environment in which to navigate by this method. Rather than precisely following a mapped route as with a GPS guidance system, this system uses LIDAR to determine the open lane between rows of permanent plants and navigates the autonomous platform safely between the rows. This system has the advantage of providing autonomous guidance to small tractors in an affordable manner. It also has another advantage in that while GPS guidance can follow a precise path, it cannot tell if an obstacle is present. The present invention has the ability to determine if an obstacle lies within the path of the platform and take appropriate actions to deal with the obstacle.

The overall object of the invention is to provide a means for replacing human labor in situations where mechanical designs can be most effective. The invention is an autonomous agriculture platform guidance system and method which can be reconfigured by software and changes in attachments. The overall advantage is primarily that the work can be done with a high degree of precision and repeatability (which translates to higher quality) at a fraction of the current cost. Additionally, an economic agricultural platform can free humans from working in situations that are dangerous, dirty or dreary. Such a system can also provide access to a higher level of information about the growing environment than otherwise is available when sensing devices are incorporated into the regular operation of the machine.

An unmanned platform capable of navigating autonomously solves many of these problems. Computers do not grow tired, do not become distracted, and have much higher multitasking capabilities. They cannot get sick from pesticides (though they do require basic protection to avoid chemical damage), and by using modern sensor technology like LIDAR (Light Detection and Ranging) or GPS (Global Positioning System), an unmanned platform can even operate at night and possibly in bad weather. Beyond the initial capital cost and regular maintenance, an unmanned platform does not require wages, benefits, or insurance.

An autonomous agriculture platform guidance system and method built through the use of a package of sensors, guidance and control components in order to maneuver a mobile platform through the highly structured environment that consists of rows of plants in order to monitor and provide plants with various needs, has not been used prior to the present invention.

Platform Guidance System and Method—System Overview

The present invention relies most heavily on LIDAR to generate real-time maps of the structure of the environment ahead of the platform (the rows of plants on either side of the driving lane) and steers the platform to stay in the open space between the rows. A touch bar is placed on the front bumper of a platform so that if it encounters an obstacle a signal is immediately sent to stop the platform.

At the present time most of the effort in developing guidance systems for agricultural platforms has focused on the use of precision GPS. Such systems are capable of guiding a platform along predetermined paths with the deviation of no more than 1 cm. GPS guidance has been found to be an extremely useful tool in the farming of vast cereal and forage crops. It has increased the efficiency of planting, managing and harvesting these crops, which have no inherent structure within the virtual "sea" of plants.

As shown in FIG. 1, 101, the present invention is made up of an automated agriculture platform with a method of locomotion including but not limited to: a tractor, a jeep, an all-terrain vehicle, a truck or a track vehicle. The agriculture platform is in constant communication with at least one sensor mounted to the platform, 102, that provides laser raster scanned three-dimensional mapping (LIDAR) which can be supplemented by additional sensors including but not limited to an inertial measurement unit (IMU), laser, machine vision, microwave radar, ultrasonic, infrared, chemical, and touch sensors as well as mechanical sensors such as an odometer. This sensor(s) detect the presence of the actual rows of plants along a pathway and any possible other obstacles, as well as the open pathways in the platform's path. The sensor(s) is in constant communication with a central processing unit, 103, such as a computer where a software program analyzes the data from the sensor(s) and transmits a signal to various actuators that control the platform, including but not limited to steering and pedal actuators in order to maneuver and propel the platform.

The platform also is capable of carrying various sensors and devices for maintaining the health of plants including but not limited to: soil moisture sensors, flower count sensors, fruit size, quality and count sensors, tree health sensors, and sensors for detecting the presence of pest infestations, along with sensors and devices for pruning, harvesting, weeding, trimming, tying, planting, spraying, pollinating or other operations on plants.

The system is economically designed to use easily accessible parts that may be mounted to a variety of platforms including but not limited to tractors, all-terrain vehicles (ATVs), 4-wheeled terrain vehicles, carts, jeeps, tracked vehicles and trucks.

Sensors to Guide the Platform—LIDAR

The research and development of the autonomous platform unexpectedly resulted in an automated platform guidance system that can be run without the need for artificial, external devices such as GPS or artificial land-based navigational beacons. Presently, all tractor guidance systems rely on GPS, artificial land-based navigational beacons located on the perimeters of a field, or wires that are laid along the centerline of the navigational path that carry a signal for a platform to follow. The present invention is completely novel in that it does not depend on or require external signals such as GPS units, artificial land-based beacons or guide wires but instead utilizes LIDAR to physically map the "closed" regions ahead of the platform that represent the planted agricultural rows and guides the platform optimally through the "open" lane between the rows.

A small but highly important percentage of the agricultural farms are based on permanent plantings of trees, vines, bushes and shrubs. Such farms have an inherent physical structure such as the rows of an orchard or vineyard that are highly conducive to three-dimensional mapping with LIDAR. The present invention is based on the use of LIDAR sensors to guide an agricultural platform and has the unexpected additional advantage that it can be implemented on a cost scale that is substantially lower than GPS, navigational beacons or path following wires.

Another unexpected benefit of a LIDAR-based navigational system is that unexpected obstacles in the path of the platform are easily detected. Guidance systems that use GPS, navigational beacons or wires allow platforms to "blindly" follow a very precise path, however they have no ability to detect unforeseen obstacles. Platform operational safety is greatly enhanced by having the ability to put a "stop" command structure into the software to prevent the platform from entering any space that is "occupied" by an object in its path (people, animals, equipment, branches, etc).

LIDAR is used as the autonomous platform's primary navigation sensor, particularly during the lane-following segments of operation. The preferred component is the LMS 291-S05 LIDAR produced by SICK USA, although any cost-effective and environmentally rugged alternative could be used. The LIDAR is mounted to the front of the autonomous platform and can be adjusted to point the sensor at a series of angles between 0° and 45° below horizontal, although based upon tests, it was unexpectedly found that the most effective angle of operation is approximately 10° below horizontal.

The objective of the LIDAR sensor data is to find and maintain the platform in the center of an agriculture lane. This objective is aided by the structured farm environment of an orchard or vineyard. Using the LIDAR sensor and based upon the "Teach and Playback" method, the platform guidance system knows precisely what the LIDAR data coming into the system should look like when the autonomous platform is in the center of a lane.

The Teach and Playback method, is a method where the platform is manually driven through the pathway, such as an orchard row or vineyard row, where an embedded computer or central processing unit records data provided by the LIDAR sensors, therefore defining a mission path to be followed by the platform at a later time. Thereafter, whenever the platform is driven down the same pathway, the system is able to compare the real-time data the system is receiving with the baseline data received from the initial drive. The system is thereby able to detect minute changes in the platform's direction.

LIDAR data is reported as two element arrays, one of distances, one of angles. Based on this data, the guidance system calculates the position of each LIDAR hit relative to the LIDAR sensor in the front of the autonomous platform. The system then defines each of these points of data as sources of a potential field for encountering an object. Given these sources, the guidance system calculates a path to follow based upon the total potential of encountering an object along fifteen straight-line tracks, each five meters long, spread through a ninety degree angle in front of the autonomous platform. The calculation selects the angle of the track with the smallest summed potential for encountering an object as the steering angle. The number and length of the straight-line tracks can be modified to match the computational power of the actual guidance system, with associated increases or decreases in the smoothness of the platform's movement down an agriculture lane.

Unexpectedly, the reason this calculation works is that the potential field represents how close a solid object is to any point in space. By selecting the track with the smallest potential of an encounter with an object, the autonomous platform will steer away from solid objects. While in an agriculture lane, the center of the pathway or lane is designed to always have the smallest potential of encountering an object, and so the calculation is designed to choose the center of a pathway.

Error is introduced into the system when none of the inspected tracks fall in the center of the lane, and the system, based upon the calculation, chooses a path outside the center of the lane. The reason for this is that the system can only analyze tracks that are approximately six degrees wide. If the actual true path is not identical to the measurement track, then an error bounded by the track width is introduced. While this error is limited to plus or minus three degrees (the tracks are 6 degrees apart), it is possible to reduce the error by changing the spacing on the tracks. Additionally, it is more important for the measurement tracks to be accurate directly in front of the autonomous platform, so conceivably the measurement tracks could be spaced further apart at the periphery.

In the configuration described above, the LIDAR unexpectedly also provides a reasonable system for detecting smaller objects in the path of the platform. However, in order to optimize lane discrimination the LIDAR is aimed primarily forward, so that the "look" of the LIDAR immediately lower than and in front of the platform is minimized. Safety with regards to small objects immediately in front of the platform can be increased by changing the angle of the LIDAR, but this is at the cost of reducing the ability to accurately define the open lane for the platform to follow. An alternative configuration is to mount one LIDAR facing forward for navigation and use a second LIDAR on a more downward angle to detect small or mobile objects immediately in front of the platform.

GPS

For successful platform navigation using solely or primarily Global Positioning System (GPS) a very high level of accuracy (on the order of centimeters) is required. However, unexpectedly in the present invention GPS may be used to establish and identify waypoints, which are precise longitude and latitude measurements at the beginning and end of each navigational path. Since lane-following in the present invention is achieved via LIDAR, unexpectedly an inexpensive GPS unit can be used to provide gross longitude and latitude measurements with a moderate level of accuracy (on the order of feet). GPS waypoints provide the general heading for the platform path, while LIDAR provides the means to safely identify the open path in which to reach the waypoints.

In the present invention, a Garmin 16HVS unit was chosen. However, alternative GPS units can easily be substituted. It is important to note that the unit must have a code interface that allows easy data retrieval and processing, provides a confidence level in the reported data, and has the ability to convert the spherical latitude/longitude position data given by the GPS into a Cartesian system based on a preset origin location (which simplifies navigation and behavior code). While other, more accurate GPS units are available, their very high cost would make the overall cost of the unmanned platform prohibitive. The interface for this unit is based on NMEA 0183 ASCII, a National Marine Electronics Association standard interface and is support by MATLAB (the high-level language and interactive program environment that was used for this guidance system).

The guidance system makes use of a single GPS unit that is mounted high on the platform's roll bar or other higher locations. The accuracy of these units is listed by the manufacturer as less than 3 meters without the use of an external DGPS beacon receiver.

Inertial Navigation System

An inertial measurement unit, or IMU, is the main component of the inertial navigational system used in this guidance program. The inertial navigation system measures the yaw and yaw rate of the tractor. This is useful for calculating the tractor's heading during turning operations. While a Microstrain 3DM-GX1 unit was used in the present configuration of the present invention, any comparable device that can provide orientation information in dynamic and static environments may be used. The sensor has a static accuracy of ±0.5 degrees for typical test conditions and a dynamic accuracy of ±2.0 degrees for dynamic test conditions. The sensor gyros have a range of 300 degrees/second. There is a gyro bias stability of 0.7 degrees/second.

Steering Wheel Actuator

The steering mechanism controller is unexpectedly based on simple proportional-integral-derivative (PID) implementation. The steering control program block is used to produce steering commands from a desired output to control the direction of the platform. A desired heading is input into this module as a single value representing the heading that the autonomous platform needs to face. The model calculates the difference between the actual heading and the desired heading and uses PID control to drive that difference to zero. The value from that PID controller is the desired steering position. That value is compared to the actual steering position and the difference is put into a PID controller to control the actual steering position.

The present invention's steering actuator consists of a gear motor (Maxon Brushed 148866) with a small spur gear attached to the end of its output shaft by a setscrew. The steering wheel drive gear is bolted to the steering wheel shaft below the actual steering wheel. Because the motor friction is so low, it is possible to manually drive the autonomous platform with the steering wheel while the steering actuator is attached.

Alternative steering mechanisms might also be employed. These include a cable-tendon drive that connects a motor pulley to a steering wheel pulley, a bracket-mounted timing belt drive, a shaft-mounted timing belt drive, a manually-engaged gear system, and a linearly-actuated gear system.

Velocity Pedal Actuator

The velocity actuator mechanism controller of the present invention is based on simple proportional-integral-derivative (PID) implementation. The velocity control program block is designed to be integrated into a closed velocity control loop. The control block takes in both the actual velocity and desired velocity in meters per second (m/s), and the pedal position as a percentage of total throw from 0 to 1. The block calculates the error between the desired pedal position and the actual pedal position and uses PID control to drive the actual position to the desired position.

Mechanically, the velocity actuator consists of a motor (Maxon Brushed 148866) that directly drives a small tab which pushes on a bar which is attached to the velocity pedal linkage on the autonomous platform. An acceptable alternative would be to employ a linear actuator, although at the present time no COTS (commercial off-the-shelf) linear actuators are designed so that the autonomous platform could still be drivable under direct human control at the seat of the autonomous platform. Also, a cable-tendon drive was used in past designs to actuate the velocity pedal forward and backward.

Motor Controller

In the present invention, a motor controller is used to convert a computer signal to motor current. The current design of this guidance system uses a Maxon ADS 50/10 Servoamplifier. While there are a number of suitable alternatives, this motor controller is enclosed, making it a good choice for the environment in which it operates.

Power

Power requirements for the sensors, computer and actuators of the present invention far exceed what is normally available on a commercial autonomous platform. Consequently, the stock alternator on a commercial tractor is replaced with a minimum 40A high capacity alternator. Other alternatives are also possible, such as an independent fuel-powered generator or a solar powered option. While a commercial uninterrupted power source (UPS) is desirable for the power system on this autonomous platform another option is to replace the stock battery on the tractor with a high capacity 500A battery. This will act as an UPS, allowing the system to run for a limited amount of time even while the engine is off and providing extra power during peak component usage.

The majority of the electrical components, including sensors, computer, and motors of the present invention, run on 12VDC. 5VDC is required for the emergency stop circuit and PC104 stack and LIDAR requires 24VDC. Extremely compact, robust, and efficient DC/DC converters are used to provide all the voltages required. The DC/DC converters stabilize power and isolate sensitive sensors from the actuators. Expensive components are fused for protection.

Computer Overview

The computer control system is built around an Ampro LittleBoard 800 with a 1.4 GHz Pentium M Processor and 512 MB of Ram. It utilizes xPC to run control code and to interface with sensors and actuators. A PC104+ stack provides the physical interface between computer and I/O cards. A Sensoray Model 328 PCI to PC/104+ Adapter adss PCI port and extends the PC/104 stack. RS422 Interface Adapter (Fastcom 422/2-PCI-335) provides two independent RS422 channels to support the two LIDARS used in this system. A Sensoray Model 526 Multifunction I/O provides analog, digital, and dedicated encoder I/O to the system. Finally, Maxon 201583-ADS 50/10 4-Q-DC Servoamplifiers are used as motor controllers for the steering and velocity systems.

The actual components described for the computer system of the present invention, the suite of sensors and the physical actuators have been provided to establish a baseline of operational performance and do not constitute restricted sets of components for this system. A wide range of suitable alternative components may exist. What is essential to the present invention is the conceptual approach to basing an autonomous agricultural guidance system on the detection of the inherent physical structure of specialty crops (trees, vines, bushes and shrubs) that are planted in well-defined distinct rows.

Software Overview

The control system of the present invention is implemented in Simulink®. A wide range of suitable alternative measurement and control software programs may exist. The basic principal of operation is what is called "teach and playback", where the operator drives the platform manually through the pathway and the embedded central processing unit records the filtered sensor data, thus defining a mission path to be followed later. The data is then off-loaded onto a host computer via a Simulink API. The operator may then choose from any previously run "teach" mission, load the path data onto the platform, and the platform will drive the path.

While in playback mode, the LIDAR sensor is used to ensure that the autonomous platform drives straight through the agriculture rows and avoids running into obstacles.

Figure 2:
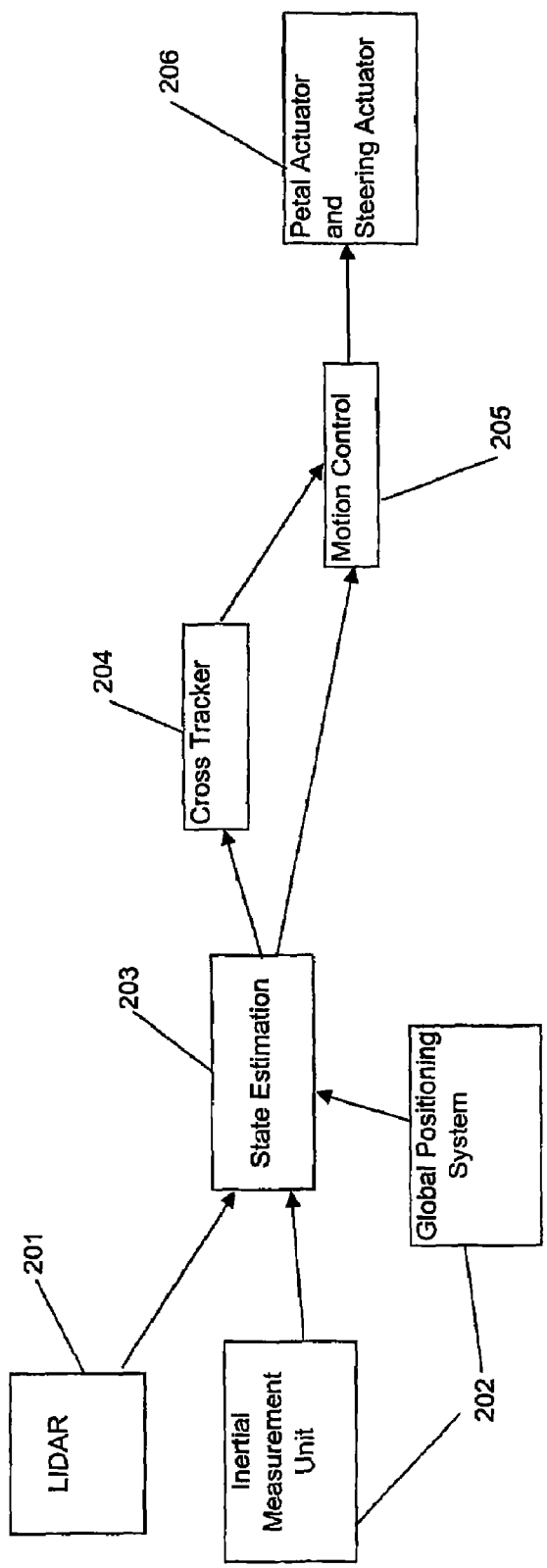
FIG. 2 shows a diagram depicting the overall system of controlling the platform.
Figure 3:
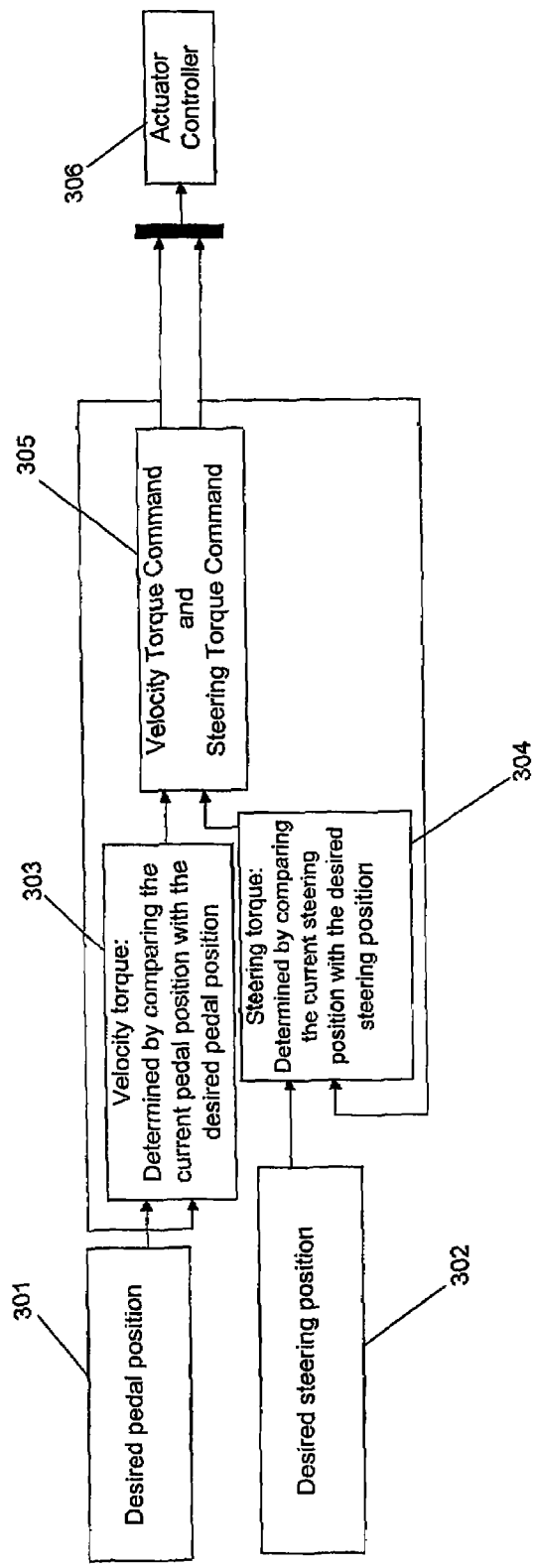
FIG. 3 shows a diagram depicting the process of determining the actuator control for both the steering and pedal actuators for the platform.

The entire software plan for control of the autonomous platform of the present invention is shown in FIG. 2 and can be thought of as falling into three major subsystems: sensing and state estimation, high-level control, and low-level direct platform control. The system begins by receiving data from the LIDAR, 201, as well as the Global Positioning System (GPS) and Inertial Measurement united sensors (IMU), 202. The data from the sensors provides the central processing unit with the current state of the platform which is then compared with the desired state of the platform, the result of which is called the state estimation, 203. The state estimation is then sent to the Cross Tracker, 204, as well as the Motion Controller, 205. As will be discussed later, the Cross Tracker will then use a calculation to determine a perpendicular error line from the autonomous platform's current position to the desired path. The analysis from the Cross Tracker is then also sent to the Motion Controller, 205. The Motion Controller then determines the desired position of the platform as well as the desired position for the steering and pedal actuators. This information is then compared with that of the actual position of the steering and pedal actuators at which time the actuators change the steering and pedal positions as is necessary, 206.

The controls of the steering and pedal actuators of the present invention are determined by first determining the desired pedal position of the pedal actuator, 301 and the desired steering position, 302. Next the velocity torque of the platform is determined by comparing the desired pedal position of the actuator with the actual pedal position of the actuator, 303. The steering torque is also determined by comparing the desired steering position with the actual steering position, 304. Finally based on the analysis of the velocity torque and steering torque, 305, a command is sent to the Actuator Controller to, if necessary, move the pedal and steering actuators to the proper position, 306.

A. Sensing and Data Processing

The first subsystem of the present invention involves taking raw data from the sensor suite and turning it into a form that is useful to the navigation of the platform. The processing required to do this is different depending on the data the sensor provides. All data collected from the sensors passes through drivers created by the MathWorks™. Using LIDAR data, a function identifies obstacles in the platform's field of view. At the same time, the position estimator combines data from the other sensors to give an estimate of where the platform is in the global reference frame with the origin at the initial position. Combining these two pieces of information, another function creates a cost map for navigation, which the platform will eventually traverse by looking for the minimum-cost path. The map creator places high cost where sensor data shows an obstacle, therefore causing the platform to avoid it.

B. High-Level Control

The high level control module of the present invention is responsible for generating a desired heading and a desired speed. This encompasses the cross tracking and potential field calculation combined based on a weighted average of the curvature of the desired path. This is an example of how the control system takes advantage of the regular geometry of the agriculture, as the straight path indicates that the platform is in a row lane.

C. Low-Level Platform Control

Once all of the decisions have been made concerning the navigation of the platform, the waypoint follower uses the current position of the platform and the target waypoints to determine the direction and speed that the platform needs to move to attain these goals. Finally, the control calculations in the steering and velocity controls turn these into appropriate motor commands to produce the desired effect through the mechanical systems.

Sensor Fusion

Even the best, most expensive sensors have error. When readings are taken on the position and velocity of the platform, sensors provide only approximations for the actual position and velocity of a platform. The sensors of the present invention used to judge the state of the autonomous platform are the IMU, which has an error of plus or minus two degrees for dynamic tests, the LIDAR, which has a standard deviation of one centimeter on measurements up to 20 m, and the GPS, which has an error of plus or minus ten centimeters for real-time measurements.

The GPS can give an estimate of speed while the IMU can judge pitch, roll and yaw, as well as X, Y, and Z accelerations. Based on modeling of the physics of the autonomous platform, these two sensors can be combined to generate a more complete picture of the state of the autonomous platform. For example, if the GPS data reads that the platform has moved backwards compared to the previous measurement and the IMU reads no appreciable acceleration, then it is reasonable to assume that the GPS reading was most likely in error.

These redundancies can effectively decrease the standard deviation of the state estimate every time sensor data is taken. This works because every time two normal curves, such as the state estimates given by the sensors, are combined, the resulting estimate is more accurate than either of the originals.

Figure 4:
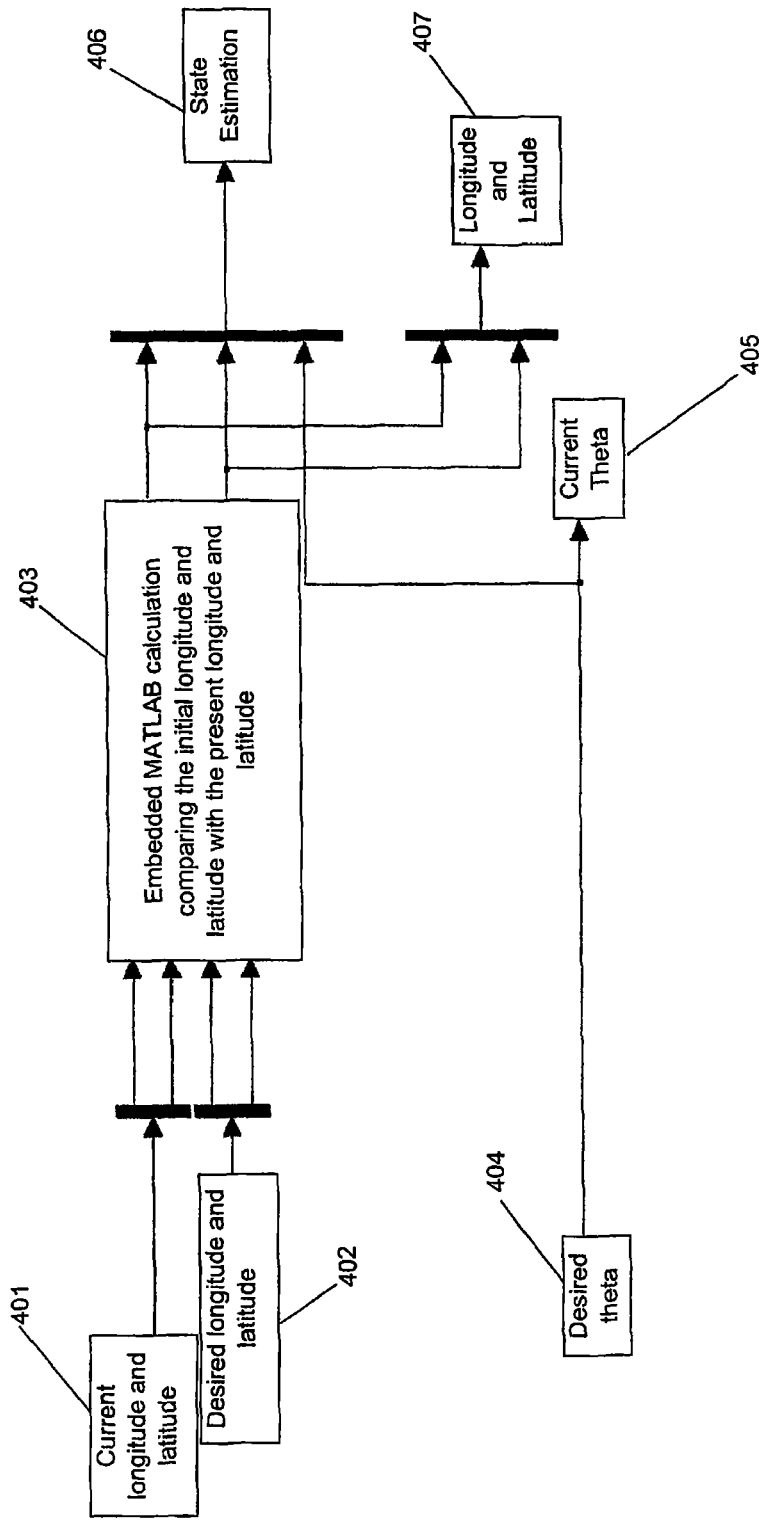
FIG. 4 shows a diagram depicting the process for determining the state estimation for the platform.

As the autonomous platform of the present invention moves forward in time, the previous state of the platform can be used to generate an estimate for the new state of the platform. To do this the system will use the current longitudinal and latitudinal data from the GPS sensor, FIG. 4, 401, as well as the desired or original longitudinal and latitudinal data, 402, and using an embedded MATLAB® calculation, compare the current data to the original longitudinal and latitudinal data from initial pass through the pathway, 403. The information is also compared with the desired theta of the platform, 404 and the current theta, 405 and the state estimation of the platform is determined, 406 as well as the longitude and latitude, 407. Due to the propagation of error from the velocity to the position, the new estimate is less accurate, but the new sensor measurements can be taken into account to reduce the error. For example, if the iterative estimate says the autonomous platform should have turned to the right, but the IMU reads that the heading hasn't changed, then one might assume that the steering angle had changed between the two sampling points, and trust the IMU.

The specific filter used in the present invention to compensate for these errors is called a Kalman filter. It relies on two major principles, which can be expressed in two equations, the estimate of state, and the estimate of sensor readings.

The embedded state calculation of the present invention is given by: $X_k = Ax_{k-1} - BU_k + W_k$, where $X_k$ is the state of the autonomous platform, given by position, heading, and velocity. The state estimate at time K relies on the state at time K−1, multiplied by a transformed A that combines the components of the state together with the current model of the platform's physics. This calculates the new platform state, assuming no commands were given to the autonomous platform between the sampling points. To account for commands given to the autonomous platform, another term is added, consisting of U, the control signal, multiplied by a different transform B which maps it into the same form as the state. In reality, there is also some noise given by Wk.

The other side of the embedded equation is given by the sensor readings, in the form of $Z_k = HX_k = V_k$, where $Z_k$ in this equation is the "true" sensor reading taken by the sensors, where H is a transform that maps the state of the platform to a measurement based on the particular sensor, and $V_k$ is an associated normally distributed noise.

Once the state estimation predictions have been made, a correction is made to the predicted state based on the actual sensor measurements, using the equation: $X_k = X_k + K(z - Hx_k)$, where $Hx_k$ is a predicted measurement based on the predicted state of the system, and K is a transform based on the error covariance of the system.

In general, the present invention can assume perfect knowledge of the pathway. Since most agriculture areas are so regular in shape, they can be characterized with a few variables (row length, row width, number of rows, row orientation). Optionally, it would also be possible to build into the present invention some "learning" of the pathway geometry while operating in the teach mode. The "state" of the tractor is then expanded and represented in terms of the pathway. Such parameters could include but are not limited to the following: current row number, distance down the row, displacement from center of row, angle relative to row. Based on the previous state of the platform, the present invention knows what the LIDAR should be seeing, and comparing what is expected to be seen to what is actually seen will allow for a probabilistic updating of the state estimate at every time step. When the platform comes to the end of a row, and while completing the turn from row to row, there is much less information available in the LIDAR data the present invention is receiving, however these periods are generally short in duration. Consequently, it would therefore be possible to maintain a high estimate of state based on the platform model from time and INS data to complete the turn.

Teach and Playback

In teach mode of the present invention the autonomous platform records data from all of its sensors which is then processed to determine the kinematics of the path. In playback mode the path following calculation uses the kinematics of the path to control the autonomous platform, while performing obstacle avoidance and lane centering. In teach mode data is recorded from the GPS, LIDAR and INS, along with steering position while a skilled operator drives the agricultural area. This allows the control system to take advantage of the knowledge of the operator, maximizing the amount of information available to the control calculations.

The data is then processed to generate the desired kinematics of the autonomous platform-based curvature from the GPS track and INS heading. The guidance program uses the driven path to determine key parameters for the agricultural area (lane spacing, end of row turn dynamics, etc) to reduce reliance on high accuracy GPS during playback. Because of this unexpected ability, this type of guidance system is highly appropriate for use within the highly structured agriculture environment.

In playback mode a robust path-following calculation, utilizing a combination of open and closed loop techniques based on recorded data and the data processing, navigates the autonomous platform through the agricultural area. The LIDAR is used for lane centering and obstacle avoidance.

Path Following Calculation

Figure 5:
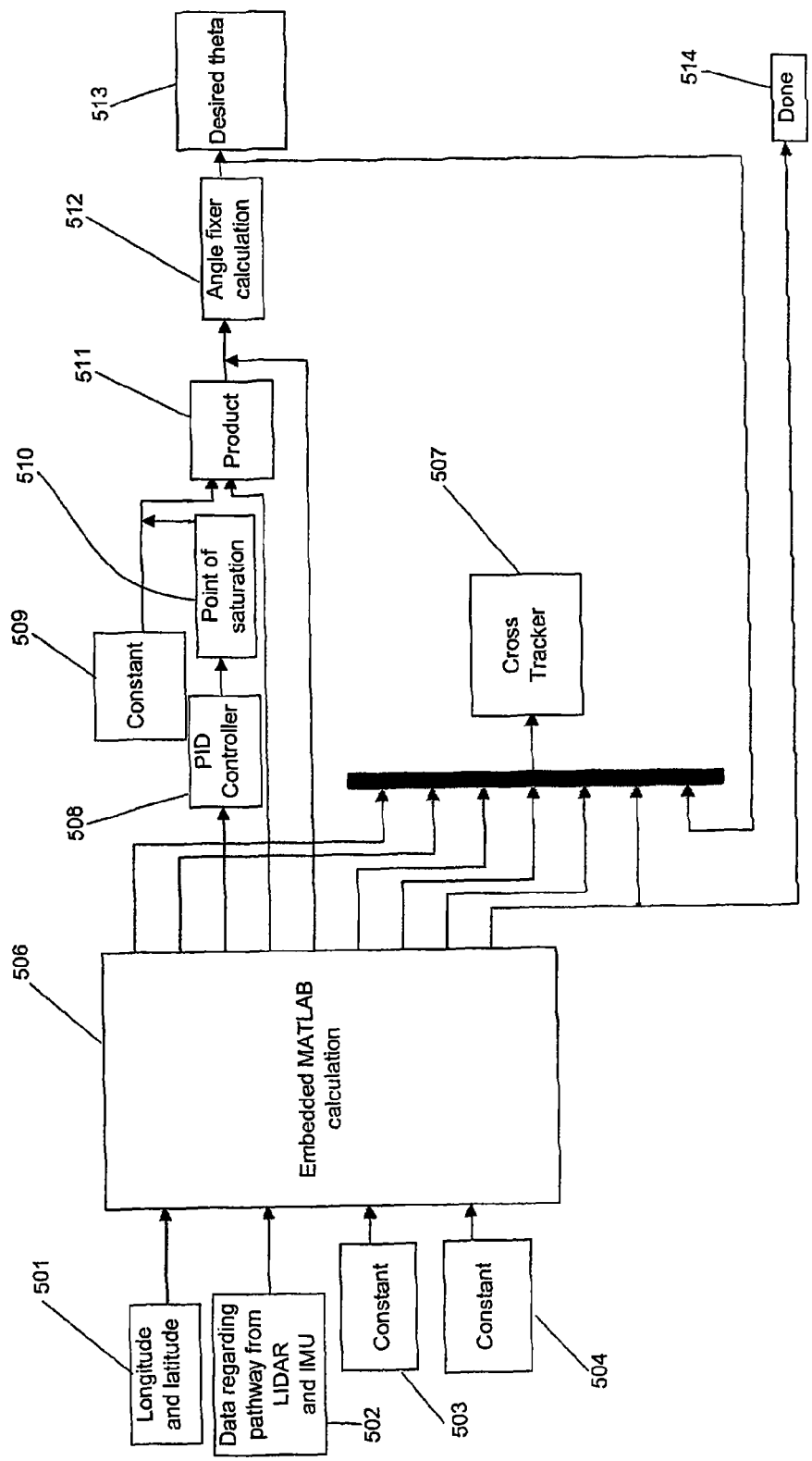
FIG. 5 shows a diagram depicting the process for determining the cross Tracker for the platform.

Using data from the GPS unit of the present invention, FIG. 5, 501, LIDAR and IMU sensors, 502, and two constants, 503 and 504, the "Cross Tracking" calculation is determined in an embedded MATLAB function to create a perpendicular error line from the autonomous platform's current position in relation to the desired path or theta, 506, 507 and whether the platform has reached the completion of its assignment, 514. The length of the perpendicular error line is the input to a PID controller, 508, which generates a desired heading, saturating at pi/2 which gives a perpendicular approach to the path for large errors lines, 510. Unless the system is saturated, based upon a constant, 509, the desired heading will always point in the direction of the next waypoint, 511, and can be corrected based upon the Angle Fixer Calculation, 512, if needed to reach the desired theta, 513. As the intersection point of the perpendicular error line and the path line segment transitions within a predetermined or standoff distance to the next waypoint in the path, the calculation transitions to the next line segment.

Setting this predetermined or standoff distance essentially determines how much the autonomous platform "looks ahead" on the path. This is a primary concern for two reasons. The first is that the steering wheel response can have significant spatial delay depending on how fast the autonomous platform is moving, and how much the curvature of the path is changing. Putting in a standoff distance allows the steering to turn to the appropriate angle before the curvature changes, giving the calculation a predictive nature. The second is that a standoff is required to prevent error during the transitions.

The desired heading from the cross tracking calculation (theta) drives another PID controller that determines the desired steering angle (phi). The desired steering angle is passed into the autonomous platform block.

Motion Controller

Figure 6:
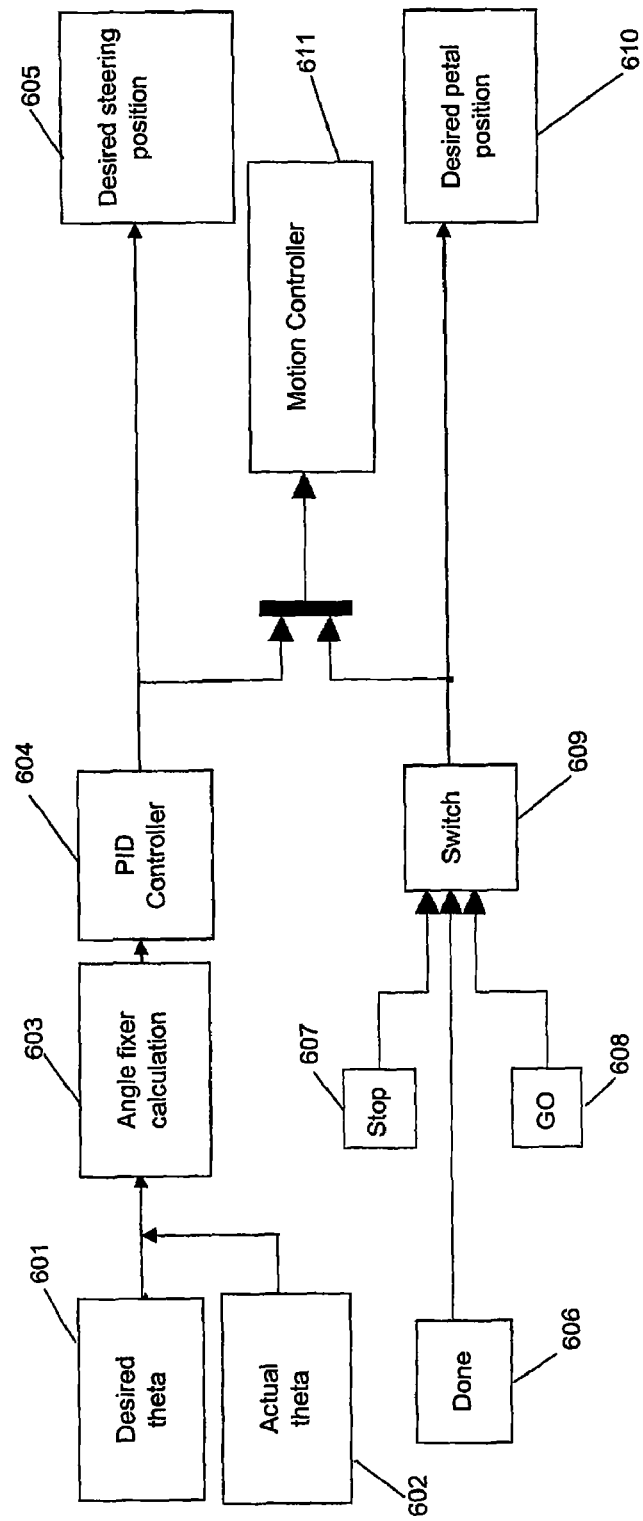
FIG. 6 shows a diagram depicting the process for determining the motion controller for the platform.

The analysis from the Motion Controller of the present invention begins by analyzing the desired theta, FIG. 6, 601, with the actual theta, 602. This information is fed into the Angle Fixer Calculation, 603, which in turn is sent to the PID Controller, 604. This information is then sent to the Motion Controller, 611, which analyzes the data related to theta along with the GO, 608, STOP, 607 and DONE, 606, signals which are relayed to the Motion Controller by way of a switch, 609. The Motion Controller then sets the steering and pedal actuator controls to the desired position, 605 and 610.

Emergency Stop

The emergency stop circuit utilizes relays to cut power to the actuators on fault. Not powered, the actuators are back-drivable to allow manual control and the velocity pedal return spring will bring the autonomous platform to a stop. Alternatively, the circuits can also be changed to make the e-stop circuit kill the autonomous platform engine as well.

A fault is raised if (a) any of the three (driver, front, rear) manual emergency stop buttons are pressed, (b) the front bumper is triggered, (c) there is a LIDAR proximity fault, (d) the computer control system is not is a ready state, or (e) the autonomous platform is put into manual mode. Indication LEDs show exactly what caused the fault to ease action after action analysis. After a fault, operation conditions must be restored and autonomous mode needs to be re-engaged, either with a button or remotely through the computer.

While the invention has been described with reference to specific embodiments, it will be apparent that numerous variations, modifications and alternative embodiments of the invention are possible, and accordingly all such variations, modifications and alternative embodiments are to be regarded as being within the scope and spirit of the present invention as claimed. The disclosure also encompasses all possible permutations of the claim set, as if they were multiple dependent claims.

The invention claimed is:

1. A system of guidance for an automated agriculture platform comprising:
   a. a platform comprising a means of locomotion and control for guiding and propelling said platform;
   b. sensing apparatus mounted on said platform comprising a global positioning system and a light detection and ranging (LIDAR) unit;
   c. a means of decision processing for determining the position of said controls comprising a central processing unit and/or artificial intelligence electronics;
   d. a means of communication between said sensing apparatus and said central processing unit and/or artificial intelligence electronics; and
   e. a means of communication between said central processing unit and/or artificial intelligence electronics and said controls mounted on said platform.

2. The system of claim 1, wherein said platform is selected from the group consisting of a tractor, an all-terrain vehicle, a jeep, a truck, and a tracked vehicle.

3. The system of claim 1, wherein said controls comprise a velocity pedal actuator and a steering actuator.

4. The system of claim 1, wherein said means of decision processing is determined by performing an analysis from the group consisting of state estimation, cross tracker, motion control, and actuator control.

5. The system of claim 4, wherein said state estimation is calculated by analyzing
   a. a present position of said platform with a desired position of said platform; and
   b. a present theta of said platform with a desired theta of said platform.

6. The system of claim 5, wherein said present position and said present theta are established using data selected from a group consisting of comprising said global positioning system and said LIDAR unit.

7. The system of claim 4, wherein said cross tracker is a calculation that is calculated to create a perpendicular error line from said platform's current position in relation to said platform's desired path.

8. The system of claim 7, wherein said calculation is established using data selected from the group consisting of said global positioning system and said LIDAR unit.

9. The system of claim 4, wherein:
   said controls comprise a velocity pedal actuator and a steering actuator; and
   said actuator control is determined by a steering torque associated with the steering actuator and a velocity pedal torque associated with the velocity pedal actuator.

10. The system of claim 9, wherein said steering torque is established by comparing a desired steering position of said steering actuator with an actual steering position of said steering actuator.

11. The system of claim 9, wherein said velocity pedal torque is determined by comparing a present position of said velocity pedal actuator of said platform with a desired position of said velocity pedal actuator.

12. The system of claim 1, wherein an emergency stop circuit in constant communication with said central processing unit is mounted to said platform.

13. The system of claim 1, wherein said platform is manually driven through a pathway and said at least one sensor gathers data and communicates said data to said central processing unit.

14. The system according to claim 1, wherein said sensing apparatus further comprises an inertial measurement unit and a touch sensor both mounted on said platform.

15. A system of guidance for an automated agriculture platform comprising:
   a. a platform comprising a means of locomotion and control for guiding and propelling said platform;
   b. one or more types of sensing apparatus mounted on said platform selected from the group consisting of a global positioning system, a light detection and ranging (LIDAR) unit, an inertial measurement unit, and a touch sensor;
   c. a means of decision processing for determining the position of said controls comprising a central processing unit and/or artificial intelligence electronics, said means of decision processing being determined by performing an analysis from the group consisting of state estimation, cross tracker, actuator control, and motion control; said motion control being an analysis of: (1) a command from a switch in constant communication with said central processing unit, wherein said command is selected from the group consisting of go, stop and done; and (2) a present theta of said platform and a desired theta of said platform;
   d. a means of communication between said sensing apparatus and said central processing unit and/or artificial intelligence electronics; and
   e. a means of communication between said central processing unit and/or artificial intelligence electronics and said controls mounted on said platform.

16. The system of claim 15, wherein said analysis is established using data selected from the group consisting of said global positioning system, and said inertial measurement unit.

17. A system of guidance for an automated agriculture platform comprising:
   a. a platform comprising a means of locomotion and control for guiding and propelling said platform;
   b. one or more types of sensing apparatus mounted on said platform selected from the group consisting of a global positioning system, a light detection and ranging (LIDAR) unit, an inertial measurement unit, and a touch sensor;
   c. a means of decision processing for determining the position of said controls comprising a central processing unit and/or artificial intelligence electronics;
   d. a means of communication between said sensing apparatus and said central processing unit and/or artificial intelligence electronics;
   e. a means of communication between said central processing unit and/or artificial intelligence electronics and said controls mounted on said platform; and
   f. an emergency stop circuit in constant communication with said central processing unit mounted to said platform, said emergency stop circuit being triggered by an event selected from a group consisting of:
      a. the pressing of a manual emergency stop button;
      b. said touch sensor is triggered;
      c. said LIDAR senses an object in said platform's path;
      d. a computer and/or artificial intelligence electronics is not in a ready state; and
      e. said platform is in manual mode.

18. A method of guidance for an automated agriculture platform comprising a means of locomotion and controls for guiding and propelling said platform, the method comprising:
   determining said guidance by:
      a. data regarding obstacles in a path of said platform; and
      b. data regarding a position of said platform;
   analyzing said data by a central processing unit, said analysis is selected from the group consisting of
      a. state estimation;
      b. cross tracker;
      c. motion control; and
      d. actuator control;
   determining said motion control by comparing motion control data regarding:
      a. a present theta of said platform and a desired theta of said platform; and
      b. a command from a switch located on said platform in constant communication with said central processing unit where said command is selected from a group consisting of
         1. go;
         2. stop; and
         3. done.

19. The method of claim 18, wherein said motion control data is provided by a sensor selected from a group consisting of a global positioning system and an inertial measurement unit.

20. A method of guidance for an automated agriculture platform comprising a means of locomotion and controls for guiding and propelling said platform, the method comprising:
   determining said guidance by:
      a. data regarding obstacles in a path of said platform; and
      b. data regarding a position of said platform;
   analyzing said data by a central processing unit, an emergency stop circuit being in constant communication with said central processing unit is mounted to said platform, said emergency stop circuit being triggered by an event selected from a group consisting:
      a. a pressing of a manual emergency stop button;
      b. a triggering of a touch sensor;
      c. sensing an object in said platforms path by a light detecting and ranging (LIDAR) unit;
      d. a computer and/or artificial intelligence electronics not being in a ready state; and
      e. said platform being in manual mode.

21. The method of claim 20, wherein said platform is manually driven through a pathway and least one sensor gathers data and communicates said data to said central processing unit.

22. A method for autonomously guiding an agricultural platform comprising:
   autonomously driving an agricultural platform along a pathway defined between rows of plants, the pathway having first and second laterally spaced-apart pathway segments, each pathway segment having first and second ends with the second end of the first pathway segment laterally aligned with the first end of the second pathway segment, by:
   identifying the ends of the pathway segments with row end location data;
   generating real-time light detection and ranging (LIDAR) navigational data corresponding to the rows of plants along the pathway segments and any obstacles along the pathway segments; and
   controlling the direction of movement and speed of movement of the agricultural platform based upon at least the row end location data and the LIDAR navigation data.

23. The method according to claim 22, further comprising:
   a teaching step comprising:
   guiding the agricultural platform in a manual mode along the pathway; and
   recording pathway information from the guiding step including the row end location data; and wherein:
   controlling the direction of movement and speed of movement of the agricultural platform is based upon at least the pathway information, the row end location data and the LIDAR navigation data.

24. The method of claim 22, wherein said controlling step comprises controlling a velocity pedal actuator and a steering actuator.

25. The method of claim 22, wherein said direction of movement controlling step is carried out using data regarding the position of said platform provided by a sensor selected from a group consisting of a global positioning system and an inertial measurement unit.

26. The method of claim 22, wherein said autonomously driving step is carried out using at least one of the following as the agricultural platform:
   a. a tractor;
   b. a jeep;
   c. an all-terrain vehicle;
   d. a tracked vehicle; and
   e. a truck.

27. The method of claim 22, wherein said data is analyzed by a central processing unit.

28. The method of claim 27, wherein said controlling step is carried out using at least one of:
   a. state estimation;
   b. cross tracker;
   c. motion control; and
   d. actuator control.

29. The method of claim 22, wherein said controlling step comprises comparing state estimation data regarding:
   a. a present position of said platform and a desired position of said platform; and b. a present theta of said platform and a desired theta of said platform.

30. The method of claim 29, wherein said state estimation data is provided by a sensor selected from a group consisting of a global positioning system and an inertial measurement unit.

31. The method of claim 22, wherein said controlling step comprises comparing cross tracker data regarding:
   a. a present position of said platform and a desired position of said platform;
   b. a present theta of said platform and a desired theta of said platform; and
   c. present LIDAR data regarding a pathway the platform is moving through.

32. The method of claim 31, wherein said cross tracker data is provided by a sensor selected from a group consisting of a global positioning system and a LIDAR unit.

* * * * *

UNITED STATES PATENT AND TRADEMARK OFFICE
CERTIFICATE OF CORRECTION

| | | |
|---|---|---|
| PATENT NO. | : 8,180,514 B2 | Page 1 of 1 |
| APPLICATION NO. | : 12/125279 | |
| DATED | : May 15, 2012 | |
| INVENTOR(S) | : Craig L. Kaprielian et al. | |

It is certified that error appears in the above-identified patent and that said Letters Patent is hereby corrected as shown below:

In claim 6, column 16, line 3, delete the phrase "consisting of".

Signed and Sealed this
Tenth Day of July, 2012

David J. Kappos
*Director of the United States Patent and Trademark Office*